(12) United States Patent
Natsui et al.

(10) Patent No.: US 12,104,535 B2
(45) Date of Patent: Oct. 1, 2024

(54) THERMAL MANAGEMENT SYSTEM FOR A GAS TURBINE ENGINE

(71) Applicant: General Electric Company, Schenectady, NY (US)

(72) Inventors: Gregory Alexander Natsui, Schenectady, NY (US); Giridhar Jothiprasad, Clifton Park, NY (US); Lana Maria Osusky, Rexford, NY (US); Thomas Malkus, Albany, NY (US)

(73) Assignee: General Electric Company, Cincinnati, OH (US)

( * ) Notice: Subject to any disclaimer, the term of this patent is extended or adjusted under 35 U.S.C. 154(b) by 130 days.

(21) Appl. No.: 17/717,402

(22) Filed: Apr. 11, 2022

(65) Prior Publication Data
US 2023/0323815 A1    Oct. 12, 2023

(51) Int. Cl.
| | | |
|---|---|---|
| *F01D 25/08* | (2006.01) | |
| *F01D 25/12* | (2006.01) | |
| *F02C 7/141* | (2006.01) | |
| *F02C 7/18* | (2006.01) | |

(52) U.S. Cl.
CPC .............. *F02C 7/18* (2013.01); *F01D 25/12* (2013.01); *F02C 7/141* (2013.01); *F05D 2220/32* (2013.01); *F05D 2260/213* (2013.01)

(58) Field of Classification Search
CPC ........... F05D 2260/213; F05D 2220/32; F05D 2260/20; F01K 25/103; F01K 23/10; F02C 6/18; F02C 7/185; F25B 2309/061

USPC ......................................................... 415/178
See application file for complete search history.

(56) References Cited

U.S. PATENT DOCUMENTS

| | | |
|---|---|---|
| 2,585,570 A | 2/1952 | Messinger et al. |
| 3,204,403 A | 9/1965 | Mordell |
| 5,419,156 A | 5/1995 | Sywulka |
| 8,327,651 B2 | 12/2012 | Finney et al. |
| 9,995,314 B2 | 6/2018 | Miller et al. |
| 10,590,786 B2 | 3/2020 | Bunker et al. |
| 10,612,383 B2 | 4/2020 | Moniz et al. |
| 10,738,791 B2 | 8/2020 | Moniz et al. |
| 10,823,066 B2 | 11/2020 | Miller et al. |
| 10,823,462 B2 | 11/2020 | Snape et al. |
| 11,105,263 B2 | 8/2021 | Francini et al. |
| 11,927,136 B1 * | 3/2024 | Burd ........................ F02C 7/143 |
| 2003/0221409 A1 | 12/2003 | McGowan |
| 2017/0002834 A1 | 1/2017 | Powell et al. |
| 2017/0082028 A1 | 3/2017 | Duong et al. |
| 2019/0128189 A1 * | 5/2019 | Rambo ................... F02K 3/115 |
| 2019/0218971 A1 | 7/2019 | Niergarth et al. |

(Continued)

FOREIGN PATENT DOCUMENTS

| | | |
|---|---|---|
| KR | 102275998 A | 5/2016 |
| WO | WO03021097 A1 | 3/2003 |

*Primary Examiner* — Long T Tran
*Assistant Examiner* — James J Kim
(74) *Attorney, Agent, or Firm* — Dority & Manning, P.A.

(57) ABSTRACT

A thermal management system for a gas turbine engine is provided. The gas turbine engine includes a turbomachine comprising a compressor section, a combustion section, a turbine section, and an exhaust section arranged in serial flow order and together defining at least in part a core air flowpath; and a thermal management system comprising a supercritical carbon dioxide line thermally coupled to, or integrated into, a portion of the compressor section.

20 Claims, 6 Drawing Sheets

(56) References Cited

U.S. PATENT DOCUMENTS

| | | |
|---|---|---|
| 2020/0224557 A1 | 7/2020 | McAuliffe et al. |
| 2020/0224588 A1 | 7/2020 | Somanath et al. |
| 2020/0224589 A1 | 7/2020 | McAuliffe et al. |
| 2020/0224590 A1 | 7/2020 | McAuliffe et al. |
| 2020/0386161 A1 | 12/2020 | Moniz et al. |
| 2022/0213802 A1* | 7/2022 | Johnson ............... F01D 11/24 |
| 2023/0358180 A1* | 11/2023 | Brady .................. F02C 3/22 |
| 2023/0366350 A1* | 11/2023 | Prabhudharwadkar ............... F01D 15/10 |

\* cited by examiner

THERMAL MANAGEMENT SYSTEM FOR A GAS TURBINE ENGINE

FIELD

The present subject matter relates generally to gas turbine engines, and more specifically to a thermal management system for a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts.

During operation, the gas turbine engine is operated to maintain a temperature of certain components within a desired operating temperature range in order to avoid damaging or otherwise pre-maturely wearing down such components. However, such may lead to inefficiencies within the turbomachine. Accordingly, a system capable of adjusting temperatures of certain components within the turbomachine during operation to allow the engine to operate more efficiently would be useful.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

In the context of a thermal management system in accordance with an exemplary aspect of the present disclosure including a supercritical carbon dioxide loop in thermal communication with a compressor section of a gas turbine engine, an upstream end refers to a point of the supercritical carbon dioxide loop immediately downstream of the compressor section and a downstream end refers to a point of the supercritical carbon dioxide loop immediately upstream of the compressor section, such that the term "upstream" refers to a location closer to the upstream end and the term "downstream" refers to a location closer to the downstream end.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, aspects of the present subject matter are directed to a thermal management system thermally coupled to, or integrated into, a portion of a compressor section of a turbomachine of a gas turbine engine. The thermal management system of the present disclosure is configured to remove and transfer heat from the compressor section.

In an exemplary embodiment, the thermal management system of the present disclosure includes a supercritical carbon dioxide line thermally coupled to, or integrated into, a portion of the compressor section. For example, the supercritical carbon dioxide line is coupled to, or integrated into, a portion of a high pressure (HP) compressor. The thermal management system is configured to actively cool the compressor section. Furthermore, the thermal management system is also configured to actively cool compressor bleed flows.

In another exemplary embodiment, the supercritical carbon dioxide line is coupled to, or integrated into, a high pressure (HP) compressor casing. It is contemplated that the supercritical carbon dioxide line may include tubes that are wrapped around the HP compressor casing.

In another exemplary embodiment, the supercritical carbon dioxide line is coupled to, or integrated into, a portion of a plurality of stator vanes of the compression section.

In one or more of these embodiments, the supercritical carbon dioxide line of the thermal management system is able to provide cooling to the compressor section, and in particular to downstream stages of the HP compressor. As gas turbine engines are driven to higher and higher performance standards, it may be beneficial to design the gas turbine engine with higher and higher overall pressure ratios ("OPR"; e.g., a pressure ration of the compressor section). However, with the higher OPRs, a temperature of the airflow through the later stages of the compressor section may become higher than uncooled components may withstand. The inventors of the present disclosure have discovered the present inventive thermal management system, which may cool certain components of the compressor section using a thermally efficient supercritical $CO_2$. More particularly, the inventors of the present disclosure have discovered the present inventive thermal management system, which may transfer heat from certain components of the compressor to other components of the gas turbine engine that may benefit from a heat addition, which may further result in a higher efficiency gas turbine engine by conserving the heat removed from the compressor section and adding the heat (energy) back into the engine upstream of the turbine section through, e.g., a fuel heat exchanger.

Figure 1:
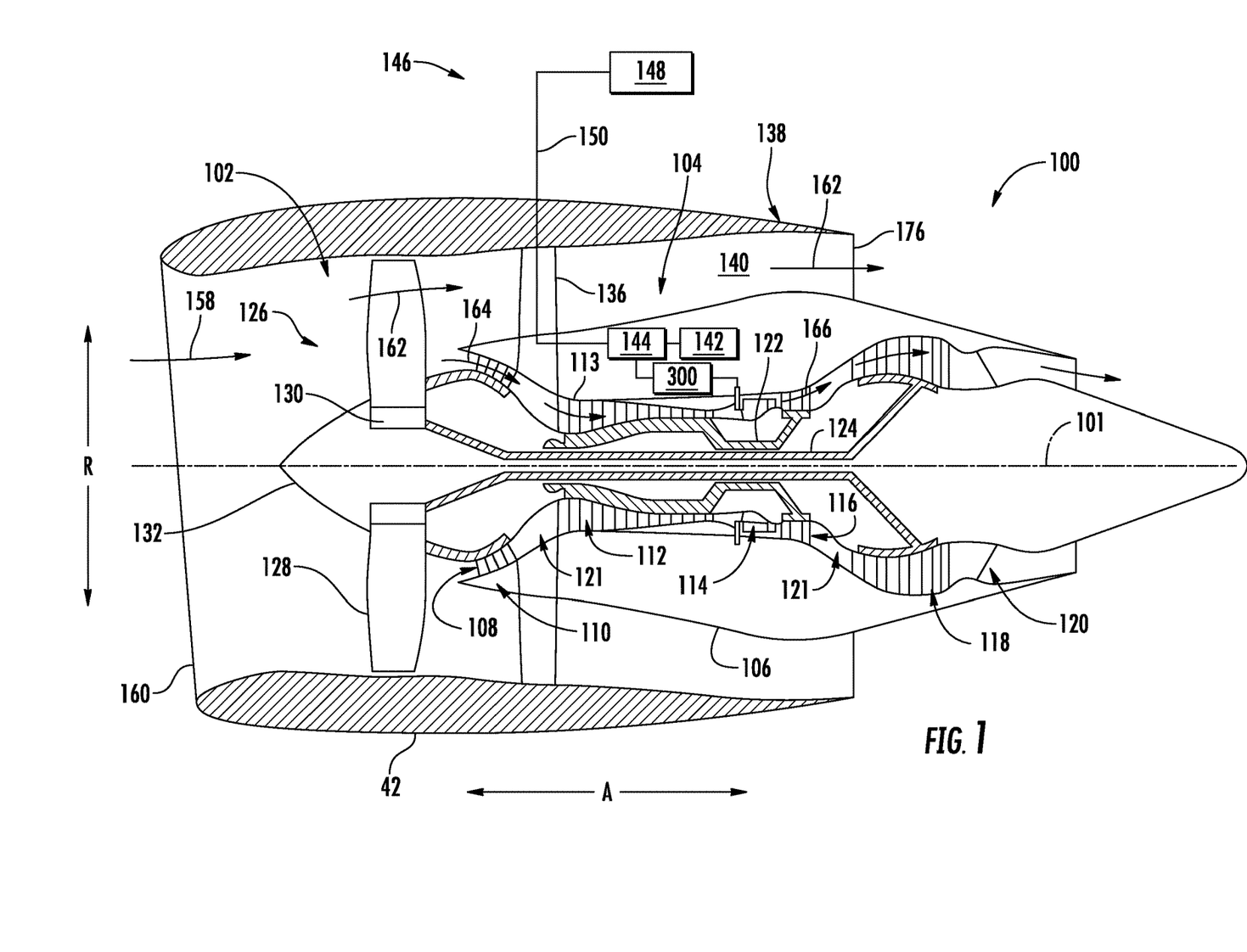
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline or axis 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet exhaust nozzle section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110. The outer casing 106 includes a HP compressor casing 113 that surrounds the HP compressor 112.

For the embodiment depicted, the fan section 102 includes a fan 126 having a plurality of fan blades 128 coupled to a disk 130 in a spaced apart manner. The plurality of fan blades 128 and disk 130 are together rotatable about the longitudinal axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen reduction unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 is coupled to, or otherwise rotatable with, the accessory gearbox 142. In such a manner, it will be appreciated that the exemplary fuel oxygen reduction unit 144 is driven by the accessory gearbox 142. Notably, as used herein, the term "fuel oxygen reduction" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100.

During operation of the turbofan engine 100, a volume of air 158 enters the turbofan 100 through an associated inlet 160 of the nacelle 134 and/or fan section 102. As the volume of air 158 passes across the fan blades 128, a first portion of the air 158 as indicated by arrows 162 is directed or routed into the bypass airflow passage 140 and a second portion of the air 158 as indicated by arrow 164 is directed or routed into the LP compressor 110. The ratio between the first portion of air 162 and the second portion of air 164 is commonly known as a bypass ratio. As stated, for the embodiment shown, the turbofan engine 100 is a high bypass turbofan engine. Accordingly, for the embodiment depicted, the bypass ratio defined by the turbofan engine 100 is greater than about 6:1 and up to about 30:1.

The pressure of the second portion of air 164 is then increased as it is routed through the high pressure (HP) compressor 112 and into the combustion section 114, where it is mixed with fuel and burned to provide combustion gases 166. Subsequently, the combustion gases 166 are routed through the HP turbine 116 and the LP turbine 118, where a portion of thermal and/or kinetic energy from the combustion gases 166 is extracted.

The combustion gases 166 are then routed through the jet exhaust nozzle section 120 of the turbomachine 104 to provide propulsive thrust. Simultaneously, the pressure of the first portion of air 162 is substantially increased as the first portion of air 162 is routed through the bypass airflow passage 140 before it is exhausted from a fan nozzle exhaust section 176 of the turbofan 100, also providing propulsive thrust.

Moreover, as is depicted schematically, the exemplary turbofan engine 100 further includes various accessory systems to aid in the operation of the turbofan engine 100 and/or an aircraft including the turbofan engine 100. For example, the exemplary turbofan engine 100 further includes a thermal management system 300 coupled to, or integrated into, a portion of the compressor section as described in more detail below with reference to FIGS. 2A-4. The thermal management system 300 is configured to remove and transfer heat from the compressor section.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen reduction unit 144 positioned within the turbomachine 104, i.e., within the outer casing 106 of the turbomachine 104, in other embodiments, the fuel oxygen reduction unit 144 may be positioned at any other suitable location. For example, in other embodiments, the fuel oxygen reduction unit 144 may instead be positioned remote from the turbofan engine 100. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc.

Figure 2A:
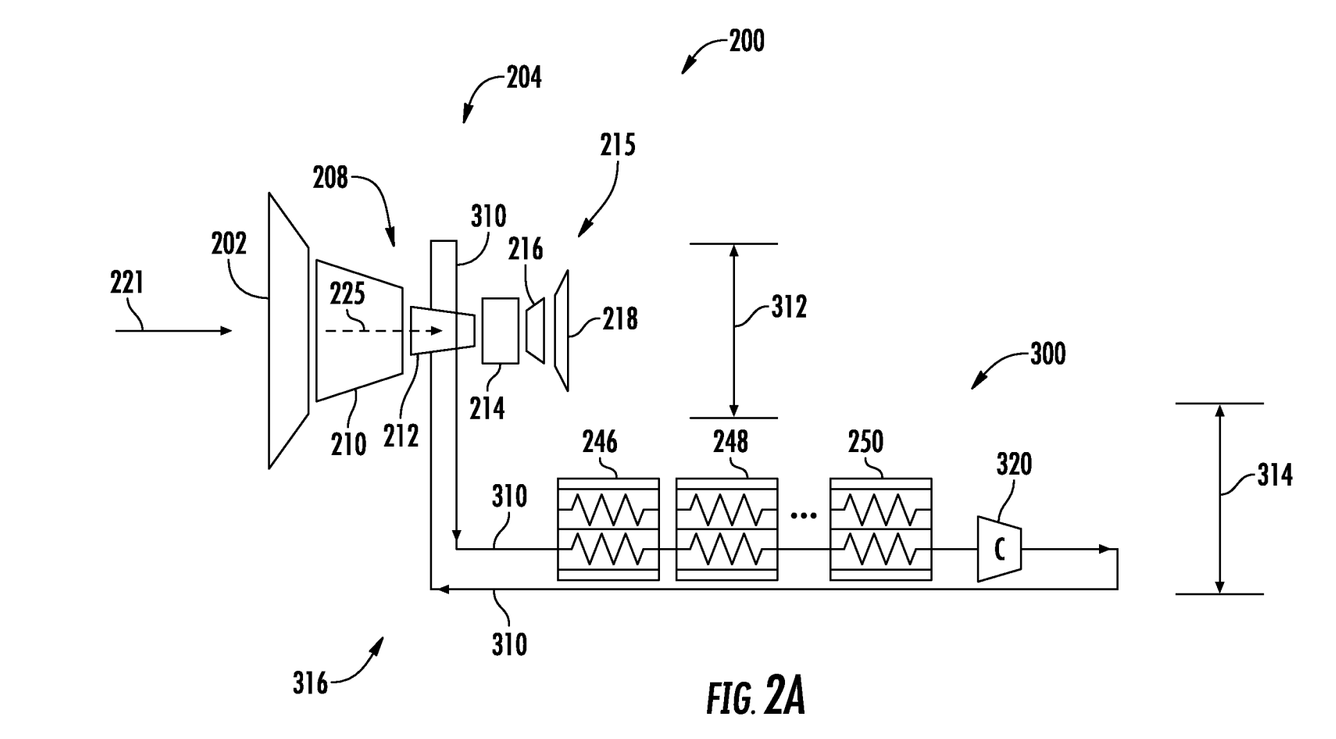
FIG. 2A is a schematic view of a section of a turbofan engine including a thermal management system in accordance with an exemplary embodiment of the present disclosure.

Referring now to FIG. 2A, a schematic view of a section of a turbofan engine 200 including a thermal management system 300 in accordance with an exemplary embodiment of the present disclosure is provided. The exemplary turbofan engine 200 may be configured in a similar manner to the exemplary turbofan engine 100 described above with reference to FIG. 1. For example, as is depicted in the exemplary turbofan engine 200 of FIG. 2A generally includes a fan section 202 and a turbomachine 204 having a compressor section 208 including a booster or low pressure (LP) compressor 210 and a high pressure (HP) compressor 212; a combustion section 214; and a turbine section 215 including a high pressure (HP) turbine 216 and a low pressure (LP) turbine 218. The compressor section 208, the combustion section 214, and the turbine section 215 together define at least in part a core air flowpath 221 extending through the turbomachine 204.

In the exemplary embodiment depicted, the thermal management system 300 includes a supercritical carbon dioxide line 310 coupled to, or integrated into, a portion of the compressor section 208. For example, the supercritical carbon dioxide line 310 is coupled to, or integrated into, a portion of the HP compressor 212. The thermal management system 300 is configured to actively cool the compressor section 208. As will be appreciated from the description herein, the supercritical carbon dioxide line 310 may contain carbon dioxide that is completely in a supercritical phase, or at least partially in a supercritical phase (e.g., transcritical). Furthermore, the thermal management system 300 is also configured to actively cool a flow of compressor bleed air.

In the exemplary embodiment depicted, the working fluid contained within the supercritical carbon dioxide line 310 is a carbon dioxide ($CO_2$) fluid, and is maintained at or above a supercritical point throughout the entirety of the working cycle. Due to being maintained at or above the supercritical point, the thermal management system 300 is referred to as a supercritical $CO_2$ cycle ($sCO_2$ cycle). It is contemplated that the $CO_2$ is substantially completely $sCO_2$ during typical operations, e.g., at least 75% by mass $sCO_2$, at least 85% by mass $sCO_2$, at least 95% by mass $sCO_2$, or at least 99% by mass $sCO_2$.

In an exemplary embodiment, the supercritical carbon dioxide line 310 is positioned in the compressor section 208, e.g., the HP compressor 212, such that the supercritical carbon dioxide line 310 is directly thermally coupled to an airflow 225 through the core air flowpath 221 at the compressor section 208 of the turbomachine 204. Notably, as used herein, the term "directly thermally coupled," with reference to two components or mediums, refers to the two components or mediums being capable of transferring heat directly and not through additional intermediate components or mediums. Furthermore, as used herein, the term "directly thermally coupled," with reference to two components or mediums, refers to the two components or mediums being capable of transferring heat directly and includes the walls and/or surfaces of the two components or mediums.

In an exemplary embodiment, the supercritical carbon dioxide line 310 of the thermal management system 300 includes a heat exchanger portion 312 and a waste heat recovery portion 314. For example, the supercritical carbon dioxide line 310 is configured as a heat sink heat exchanger, e.g., the heat exchanger portion 312, for removing heat from the airflow 225 through the core air flowpath 221 at the compressor section 208.

In an exemplary embodiment, the supercritical carbon dioxide line 310 of the thermal management system 300 includes the heat exchanger portion 312 and the waste heat recovery portion 314 which together form a supercritical carbon dioxide loop 316 that removes the heat from the airflow 225 and rejects the heat to an engine component located along the carbon dioxide loop 316 at a location downstream of the compressor section 208. For example, in the exemplary embodiment depicted in FIG. 2A, the engine component includes a fuel delivery system 246, a fuel oxygen reduction unit 248, or other bypass flow component 250. In an exemplary embodiment, the waste heat recovery portion 314 of the supercritical carbon dioxide line 310 travels through each of the fuel delivery system 246, the fuel oxygen reduction unit 248, and the other bypass flow component 250.

In the exemplary embodiment depicted, the thermal management system 300 is a closed thermal system and includes a thermal management compressor 320 that compresses the working fluid within the supercritical carbon dioxide line 310 to increase the temperature and the pressure of the working fluid. The thermal management compressor 320 of the thermal management system 300 drives flow through the supercritical carbon dioxide line 310 by increasing its pressure. It is contemplated that the thermal management compressor 320 is driven by an electric motor or an accessory gearbox, e.g., the accessory gearbox 142 (FIG. 1).

In an exemplary embodiment, the thermal management compressor 320 is located downstream of the fuel delivery system 246, the fuel oxygen reduction unit 248, and the other bypass flow component 250. In such an embodiment, the thermal management compressor 320 is located at the lowest temperature portion in the waste heat recovery portion 314 of the carbon dioxide loop 316. In other exemplary embodiments, it is contemplated that the thermal management compressor 320 is located upstream of the fuel delivery system 246, the fuel oxygen reduction unit 248, and the other bypass flow component 250.

In an exemplary embodiment, the supercritical carbon dioxide line 310 is coupled to, or integrated into, the HP compressor casing 113 (FIG. 1).

Figure 2B:
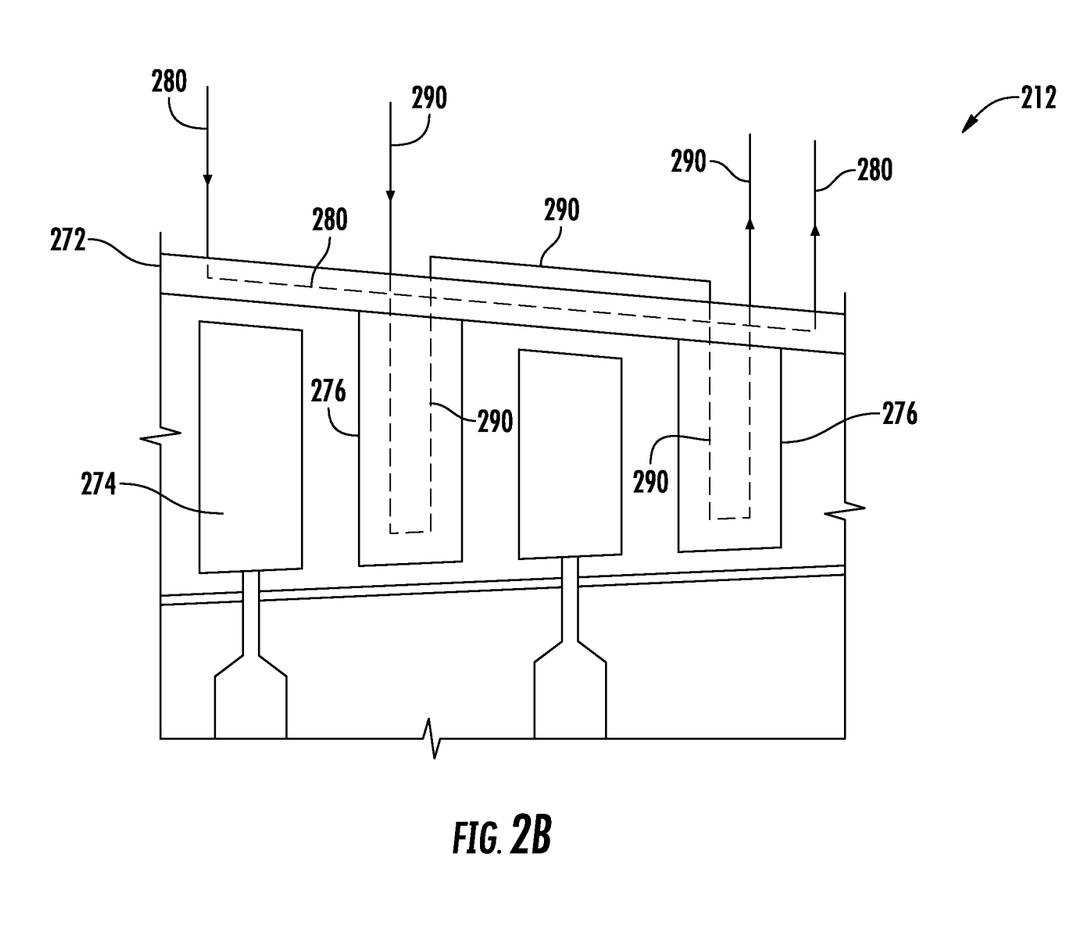
FIG. 2B is a close-up, schematic view of a section of a high pressure (HP) compressor section of FIG. 2A in accordance with an exemplary embodiment of the present disclosure.

In particular, referring briefly to FIG. 2B, providing a close-up, schematic view of a portion of the HP compressor 212 of FIG. 2A, it will be appreciated that the compressor section (e.g., the HP compressor 212) includes an HP compressor casing 272, a plurality of HP compressor rotor blades 274, a plurality of HP compressor stator vanes 276, and a plurality of ducts entering and leaving the HP compressor 212 [e.g., an exit flow-path leaving a last stage of the HP compressor 212 leading to the combustion section 214 (see FIG. 2A), a plurality of bleed ducts for providing one or more bleed airflows from the HP compressor 212, and a gooseneck duct (not shown) leading from the LP compressor 210 (see FIG. 2A) to the HP compressor 212]. In an exemplary embodiment, a first supercritical carbon dioxide line 280 is thermally coupled to, or integrated into, a portion of the HP compressor casing 272. In other exemplary embodiments, a second supercritical carbon dioxide line 290 is thermally coupled to, or integrated into, a portion of the plurality of HP compressor stator vanes 276. It is also contemplated that the supercritical carbon dioxide line 310 includes both the first supercritical carbon dioxide line 280 that is thermally coupled to, or integrated into, a portion of the HP compressor casing 272 and the second supercritical carbon dioxide line 290 that is thermally coupled to, or integrated into, a portion of the plurality of HP compressor stator vanes 276, as shown in FIG. 2B.

It is contemplated that the supercritical carbon dioxide line 310 may include tubes, e.g., the first supercritical carbon dioxide line 280, that are wrapped around the HP compressor casing 272. In one or more of these embodiments, the supercritical carbon dioxide line 310 of the thermal management system 300 is able to provide cooling to the compressor section 208, and in particular to downstream stages of the HP compressor 212. As gas turbine engines are driven to higher and higher performance standards, it may be beneficial to design the gas turbine engine with higher and higher overall pressure ratios ("OPR"; e.g., a pressure ration of the compressor section 208). However, with the higher OPRs, a temperature of the airflow through the later stages of the compressor section 208 may become higher than uncooled components may withstand. The inventors of the present disclosure have discovered that the present inventive thermal management system 300 may cool certain components of the compressor section 208 using a thermally efficient supercritical $CO_2$. More particularly, the inventors of the present disclosure have discovered that the present inventive thermal management system 300 may transfer heat from certain components of the compressor 208 to other components of the gas turbine engine that benefit from a heat addition and may further result in a higher efficiency gas turbine engine by conserving the heat removed from the compressor section 208 and adding the heat (energy) back into the engine upstream of the turbine section 215 through, e.g., a fuel heat exchanger.

Figure 3:
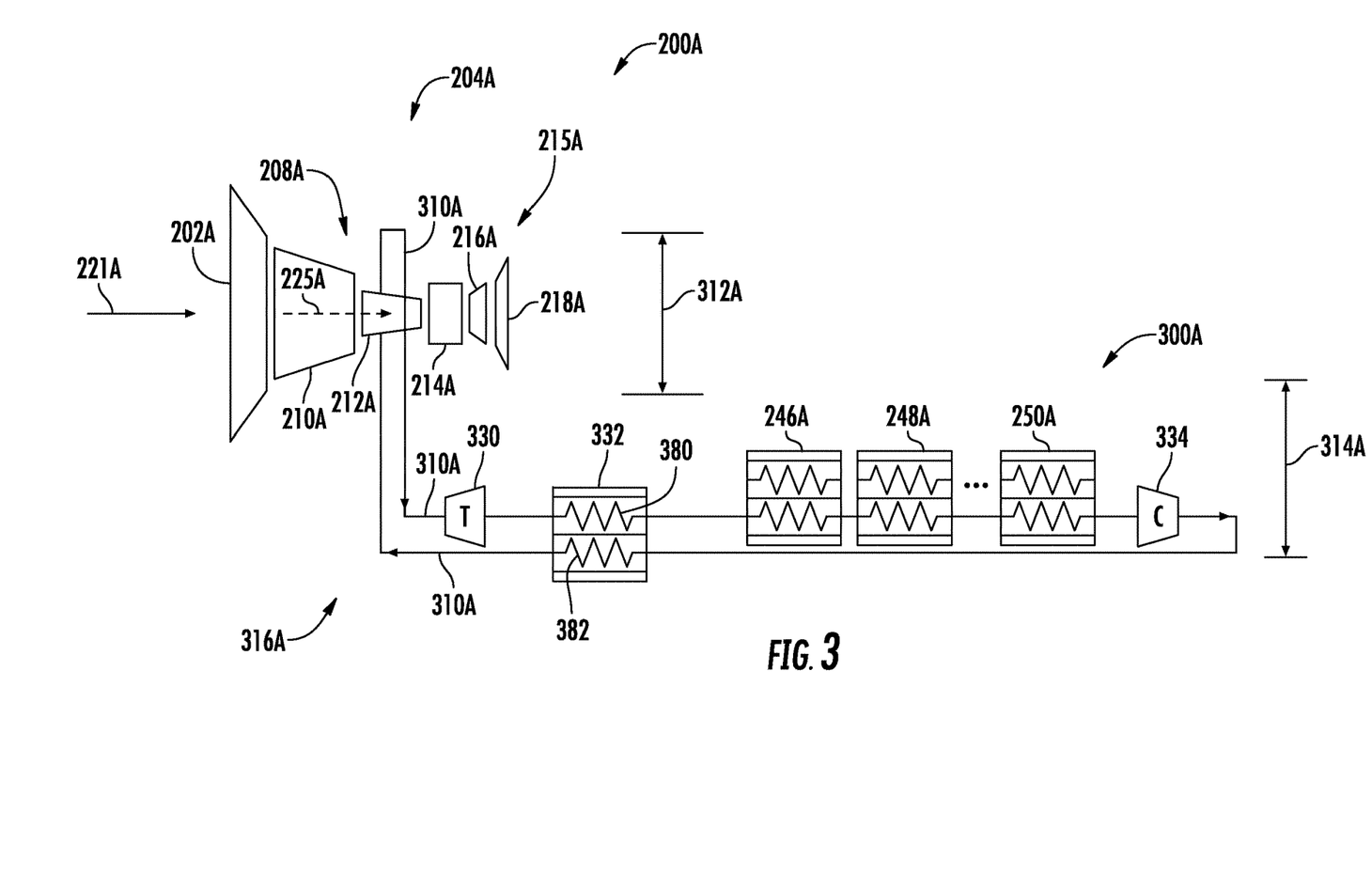
FIG. 3 is a schematic view of a section of a turbofan engine including a thermal management system in accordance with another exemplary embodiment of the present disclosure.

Referring now to FIG. 3, a schematic view of a section of a turbofan engine 200A including a thermal management system 300A in accordance with an exemplary embodiment of the present disclosure is provided. The exemplary turbofan engine 200A and the thermal management system 300A may be configured in substantially the same manner as the exemplary turbofan engine 200 and the thermal management system 300 described above with reference to FIG. 2A. The embodiment illustrated in FIG. 3 includes similar components to the embodiment illustrated in FIG. 2A, and the similar components are denoted by a reference number followed by the letter A. For the sake of brevity, these similar components of the turbofan engine 200A and the thermal management system 300A (FIG. 3) will not all be discussed in conjunction with the embodiment illustrated in FIG. 3.

In the exemplary embodiment depicted, the thermal management system 300A is a closed power cycle and includes a thermal management turbine 330 (which may also be referred to as a thermal management expansion device), a thermal management recuperator 332 (which may also be referred to as a recuperator heat exchanger) downstream of the thermal management turbine 330, and a thermal management compressor 334 downstream of the thermal management turbine 330 and the thermal management recuperator 332. Referring still to FIG. 3, the recuperator heat exchanger 332 is in thermal communication with the supercritical carbon dioxide line 310 at a first location 380 downstream of the thermal management expansion device 330 and upstream of the thermal management compressor 334, and at a second location 382 downstream of thermal management compressor 334.

It is contemplated that the thermal management compressor 334 is driven by a shaft of the thermal management turbine 330. In this exemplary embodiment, the thermal management turbine 330 expands the working fluid within the supercritical carbon dioxide line 310A to reduce the temperature and the pressure of the working fluid. For example, the thermal management turbine 330 expands the working fluid within the supercritical carbon dioxide line 310A corresponding to a decrease in its pressure and temperature. Furthermore, the thermal management turbine 330 is configured to extract power from the working fluid within the supercritical carbon dioxide line 310A to generate shaft power. This power from the thermal management turbine 330 will be greater than the power consumed by the thermal management compressor 334. Therefore, there is a net power input to the shaft when it is interacting with the thermal management system 300A. This excess power can be provided to a generator to provide electric power.

Furthermore, the thermal management compressor 334 compresses the working fluid within the supercritical carbon dioxide line 310A to increase the temperature and the pressure of the working fluid. The power to drive the thermal management compressor 334 is provided by the power generated by the thermal management turbine 330.

In an exemplary embodiment, the thermal management system 300A is a closed loop, recuperated Brayton power cycle. Such a Brayton power cycle includes compression, heat addition, expansion, and heat rejection. For this reason, the thermal management turbine 330 is located downstream of the highest temperature portion in the waste heat recovery portion 314A of the carbon dioxide loop 316A. Also, the thermal management compressor 334 is located at the lowest temperature portion in the waste heat recovery portion 314A of the carbon dioxide loop 316A.

In an exemplary embodiment, the thermal management turbine 330 does not extract all of the usable work potential out of the flow of the working fluid within the supercritical carbon dioxide line 310A. It is advantageous to take some of the remaining energy in the flow of the working fluid within the supercritical carbon dioxide line 310A and transfer it to the compressed working fluid within the supercritical carbon dioxide line 310A. Such utilization of waste heat represents a significant amount of heat addition, or pre-heating, to the high pressure low temperature working fluid within the supercritical carbon dioxide line 310A downstream of the thermal management compressor 334. In such a manner, the thermal management recuperator 332 is configured to increase the thermodynamic efficiency of the power cycle of the thermal management system 300A.

Figure 4:
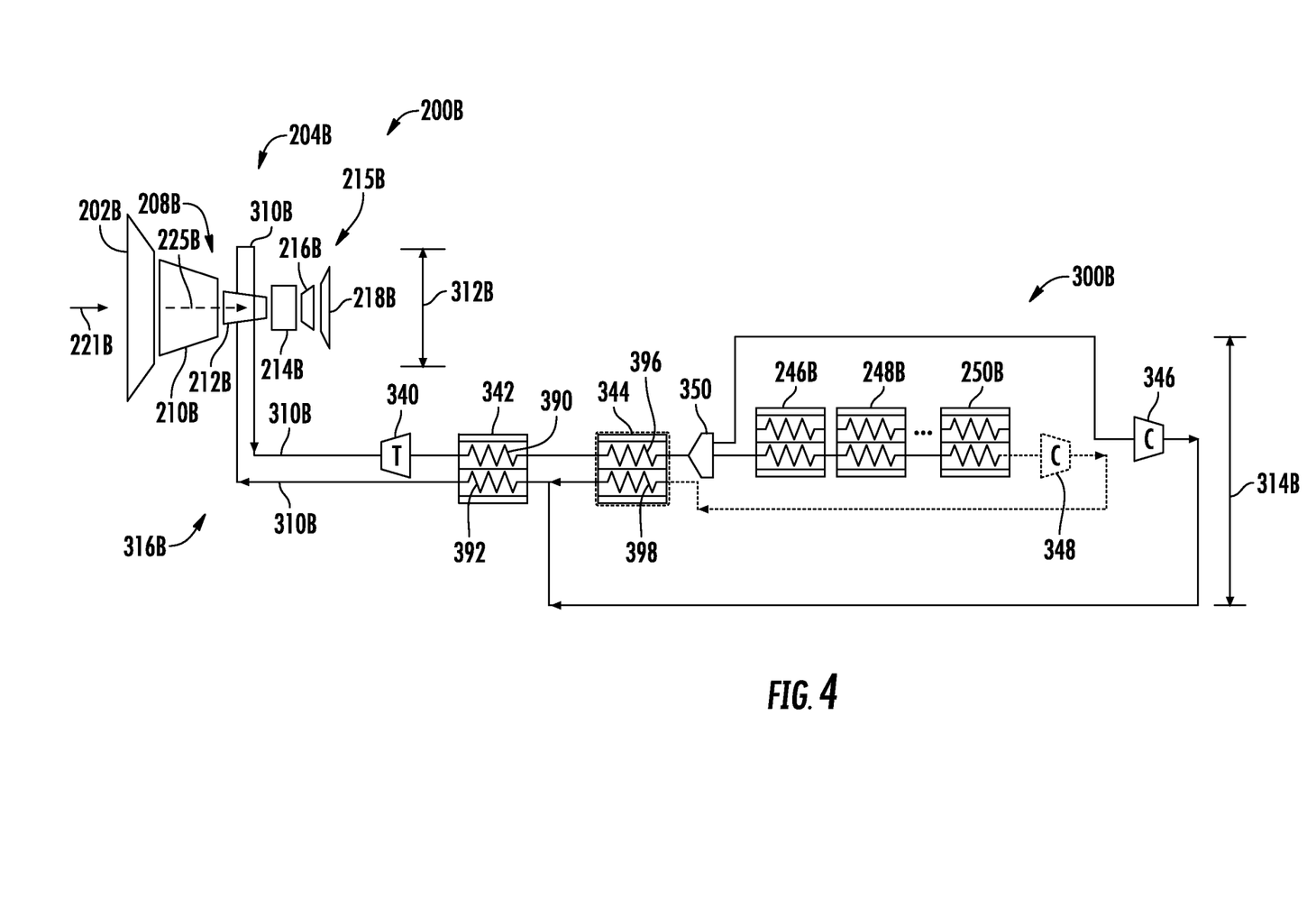
FIG. 4 is a schematic view of a of a section of a turbofan engine including a thermal management system in accordance with another exemplary embodiment of the present disclosure.

Referring now to FIG. 4, a schematic view of a section of a turbofan engine 200B including a thermal management system 300B in accordance with an exemplary embodiment of the present disclosure is provided. The exemplary turbofan engine 200B and the thermal management system 300B may be configured in substantially the same manner as the exemplary turbofan engine 200 and the thermal management system 300 described above with reference to FIG. 2A. The embodiment illustrated in FIG. 4 includes similar components to the embodiment illustrated in FIG. 2A, and the similar components are denoted by a reference number followed by the letter B. For the sake of brevity, these similar components of the turbofan engine 200B and the thermal management system 300B (FIG. 4) will not all be discussed in conjunction with the embodiment illustrated in FIG. 4.

In the exemplary embodiment depicted, the thermal management system 300B is a closed power cycle and includes a thermal management turbine 340 (which may also be referred to as a thermal management expansion device), a first thermal management recuperator 342 (which may also be referred to as a first recuperator heat exchanger) downstream of the thermal management turbine 340, a second thermal management recuperator 344 (which may also be referred to as a second recuperator heat exchanger) downstream of the thermal management turbine 340, a first thermal management compressor 346 downstream of the thermal management turbine 340 and the thermal management recuperators 342, 344, and a second thermal management compressor 348 downstream of the thermal management turbine 340 and the thermal management recuperators 342, 344. It is contemplated that the thermal management compressors 346, 348 are each driven by a shaft of the thermal management turbine 340. In this exemplary embodiment, the thermal management turbine 340 expands the working fluid within the supercritical carbon dioxide line 310B to reduce the temperature and the pressure of the working fluid. For example, the thermal management turbine 340 expands the working fluid within the supercritical carbon dioxide line 310B corresponding to a decrease in its pressure and temperature. Furthermore, the thermal management turbine 340 is configured to extract power from the working fluid within the supercritical carbon dioxide line 310B to generate shaft power. This power from the thermal management turbine 340 will be greater than the power consumed by the thermal management compressors 346, 348. Therefore, there is a net power input to the shaft when it is interacting with the thermal management system 300B. This excess power can be provided to a generator to provide electric power.

Furthermore, the thermal management compressors 346, 348 compress the working fluid within the supercritical carbon dioxide line 310B to increase the temperature and the pressure of the working fluid. The power to drive the thermal management compressors 346, 348 are provided by the power generated by the thermal management turbine 340. In this exemplary embodiment, the thermal management system 300B includes a splitter portion 350 that splits the flow of the working fluid within the supercritical carbon dioxide line 310B to the first thermal management compressor 346 and the second thermal management compressor 348.

In an exemplary embodiment, the thermal management system 300B is a closed loop, recuperated Brayton power cycle. Such a Brayton power cycle includes compression, heat addition, expansion, and heat rejection. For this reason, the thermal management turbine 340 is located downstream of the highest temperature portion in the waste heat recovery portion 314B of the carbon dioxide loop 316B. Also, the thermal management compressors 346, 348 are located at the lowest temperature portion in the waste heat recovery portion 314B of the carbon dioxide loop 316B.

In an exemplary embodiment, the thermal management turbine 340 does not extract all of the usable work potential out of the flow of the working fluid within the supercritical carbon dioxide line 310B. It is advantageous to take some of the remaining energy in the flow of the working fluid within the supercritical carbon dioxide line 310B and transfer it to the compressed working fluid within the supercritical carbon dioxide line 310B. Such utilization of waste heat represents a significant amount of heat addition, or pre-heating, to the high pressure low temperature working fluid within the supercritical carbon dioxide line 310B downstream of the thermal management compressors 346, 348. In such a manner, the thermal management recuperators 342, 344 are configured to increase the thermodynamic efficiency of the power cycle of the thermal management system 300B. In an exemplary embodiment, the first thermal management recuperator 342 is a high temperature recuperator and the second thermal management recuperator 344 is a low temperature recuperator.

In this manner, by having multiple recuperators 342, 344, their duty is split so that the cycle can better match flow capacity (e.g., mass flow multiplied by specific heat) on the hot and cold sides of the recuperators 342, 344. In an exemplary embodiment, the specific heat of the $sCO_2$ is higher downstream of the thermal management compressors 346, 348. Therefore, the flow is split so that the flow capacity better matches the high temperature side to enable more efficient power conversion efficiency.

Referring still to FIG. 4, the first recuperator heat exchanger 342 is in thermal communication with the supercritical carbon dioxide line 310B at a first location 390 downstream of the thermal management expansion device 340 and upstream of the splitter portion 350, and at a second location 392 downstream of the splitter portion 350. Furthermore, the second recuperator heat exchanger 344 is in thermal communication with the supercritical carbon dioxide line 310B at a first location 396 downstream of the thermal management expansion device 340 and upstream of the splitter portion 350, and at a second location 398 downstream of the splitter portion 350.

Figure 5:
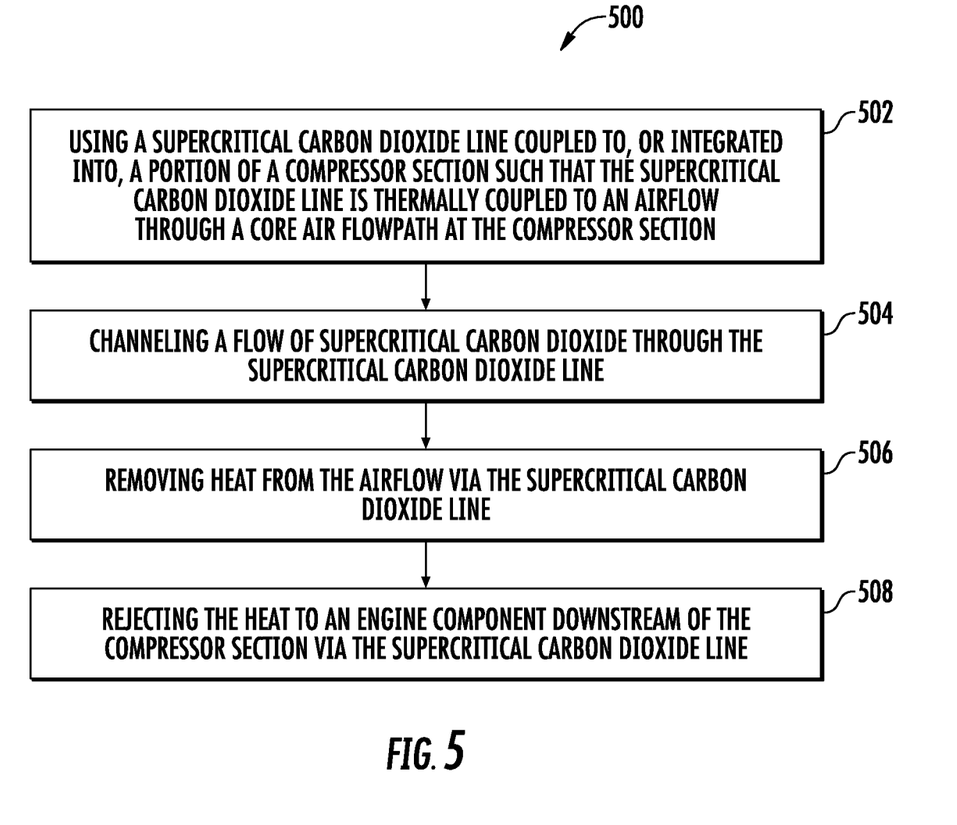
FIG. 5 is a flow diagram of a method for actively cooling a portion of a gas turbine engine in accordance with an exemplary aspect of the present disclosure.

Referring now to FIG. 5, a method 500 for actively cooling a gas turbine engine, the gas turbine engine comprising a turbomachine having a compressor section, a combustion section, a turbine section, and an exhaust section arranged in serial flow order and together defining at least in part a core air flowpath is provided. In certain exemplary aspects, the method 500 may be utilized with one or more of the exemplary thermal management systems described above.

The method 500 includes at (502) using a supercritical carbon dioxide line coupled to, or integrated into, a portion of a compressor section such that the supercritical carbon dioxide line is thermally coupled to an airflow through a core air flowpath at the compressor section as described in detail above with reference to FIGS. 1 through 4.

The method 500 further includes at (504) channeling a flow of supercritical carbon dioxide through the supercritical carbon dioxide line as described in detail above with reference to FIGS. 1 through 4.

For the exemplary aspect depicted, the method 500 further includes at (506) removing heat from the airflow via the supercritical carbon dioxide line as described in detail above with reference to FIGS. 1 through 4.

For the exemplary aspect depicted, the method 500 further includes at (508) rejecting the heat to an engine component downstream of the compressor section via the supercritical carbon dioxide line as described in detail above with reference to FIGS. 1 through 4. Notably, in at least certain exemplary aspects, the engine component may be a fuel heat exchanger. In such a manner, the heat extracted from the airflow via the supercritical carbon dioxide line may be added back to the working gas flowpath at a location upstream of the turbine section, such that the heat may be used to generate useful work for the engine.

Further aspects of the disclosure are provided by the subject matter of the following clauses:

A gas turbine engine comprising: a turbomachine comprising a compressor section, a combustion section, a turbine section, and an exhaust section arranged in serial flow order and together defining at least in part a core air flowpath; and a thermal management system comprising a supercritical carbon dioxide line thermally coupled to, or integrated into, a portion of the compressor section.

The gas turbine engine of any preceding clause, wherein the thermal management system is configured to actively cool the compressor section.

The gas turbine engine of any preceding clause, wherein the thermal management system is configured to actively cool a flow of compressor bleed air.

The gas turbine engine of any preceding clause, wherein the supercritical carbon dioxide line is positioned in the compressor section such that the supercritical carbon dioxide line is directly thermally coupled to an airflow through the core air flowpath at the compressor section.

The gas turbine engine of any preceding clause, wherein the compressor section includes a high pressure compressor casing, and wherein the supercritical carbon dioxide line is thermally coupled to, or integrated into, a portion of the high pressure compressor casing.

The gas turbine engine of any preceding clause, wherein the compressor section includes a plurality of stator vanes, and wherein the supercritical carbon dioxide line is thermally coupled to, or integrated into, a portion of the plurality of stator vanes.

The gas turbine engine of any preceding clause, wherein the thermal management system further comprises a recuperator heat exchanger, a thermal management expansion device, and a thermal management compressor, wherein the recuperator heat exchanger is in thermal communication with the supercritical carbon dioxide line at a first location downstream of the thermal management expansion device and upstream of the thermal management compressor, and at a second location downstream of thermal management compressor.

The gas turbine engine of any preceding clause, wherein the supercritical carbon dioxide line is configured as a heat sink heat exchanger for removing heat from an airflow through the core air flowpath at the compressor section.

The gas turbine engine of any preceding clause, wherein the supercritical carbon dioxide line comprises a supercritical carbon dioxide loop that removes the heat from the airflow and rejects the heat to an engine component located along the carbon dioxide loop at a location downstream of the compressor section.

The gas turbine engine of any preceding clause, wherein the engine component comprises a fuel delivery system.

The gas turbine engine of any preceding clause, wherein the thermal management system is a closed thermal system and further comprises a thermal management compressor.

The gas turbine engine of any preceding clause, wherein the thermal management system is a closed power cycle and further comprises a thermal management expansion device and a thermal management compressor downstream of the thermal management expansion device.

The gas turbine engine of any preceding clause, wherein the thermal management system is a closed power cycle and further comprises a thermal management expansion device, a first thermal management compressor downstream of the thermal management expansion device, a second thermal management compressor downstream of the thermal management expansion device, and a splitter portion that splits a flow of supercritical carbon dioxide from the thermal management expansion device to the first thermal management compressor and the second thermal management compressor.

A thermal management system for a gas turbine engine, the gas turbine engine comprising a turbomachine having a compressor section, a combustion section, a turbine section, and an exhaust section arranged in serial flow order and together defining at least in part a core air flowpath, the thermal management system comprising: a supercritical carbon dioxide line configured to be thermally coupled to, or integrated into, a portion of the compressor section.

The thermal management system of any preceding clause, wherein the supercritical carbon dioxide line is positioned in the compressor section such that the supercritical carbon dioxide line is directly thermally coupled to an airflow through the core air flowpath at the compressor section.

The thermal management system of any preceding clause, wherein the compressor section includes a high pressure compressor casing, and wherein the supercritical carbon dioxide line is coupled to, or integrated into, a portion of the high pressure compressor casing.

The thermal management system of any preceding clause, wherein the compressor section includes a plurality of stator vanes, and wherein the supercritical carbon dioxide line is thermally coupled to, or integrated into, a portion of the plurality of stator vanes.

The thermal management system of any preceding clause, wherein the thermal management system further includes a recuperator heat exchanger, a thermal management expansion device, and a thermal management compressor, wherein the recuperator heat exchanger is in thermal communication with the supercritical carbon dioxide line at a first location downstream of the thermal management expansion device and upstream of the thermal management compressor, and at a second location downstream of thermal management compressor.

A method for actively cooling a gas turbine engine, the gas turbine engine comprising a turbomachine having a compressor section, a combustion section, a turbine section, and an exhaust section arranged in serial flow order and together defining at least in part a core air flowpath, the method comprising: using a supercritical carbon dioxide line coupled to, or integrated into, a portion of the compressor section such that the supercritical carbon dioxide line is thermally coupled to an airflow through the core air flowpath at the compressor section; channeling a flow of supercritical carbon dioxide through the supercritical carbon dioxide line; and removing heat from the airflow via the supercritical carbon dioxide line.

The method of any preceding clause, further comprising rejecting the heat to an engine component downstream of the compressor section via the supercritical carbon dioxide line.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine comprising:
   a turbomachine comprising a compressor section, a combustion section, a turbine section, and an exhaust section arranged in serial flow order and together defining at least in part a core air flowpath; and
   a thermal management system comprising a supercritical carbon dioxide line integrated into a portion of the compressor section.

2. The gas turbine engine of claim 1, wherein the thermal management system is configured to actively cool the compressor section.

3. The gas turbine engine of claim 1, wherein the thermal management system is configured to actively cool a flow of compressor bleed air.

4. The gas turbine engine of claim 1, wherein the supercritical carbon dioxide line is positioned in the compressor section such that the supercritical carbon dioxide line is directly thermally coupled to an airflow through the core air flowpath at the compressor section.

5. The gas turbine engine of claim 1, wherein the compressor section includes a high pressure compressor casing, and wherein the supercritical carbon dioxide line is integrated into a portion of the high pressure compressor casing.

6. The gas turbine engine of claim 1, wherein the compressor section includes a plurality of stator vanes, and wherein the supercritical carbon dioxide line is thermally coupled to, or integrated into, a portion of the plurality of stator vanes.

7. The gas turbine engine of claim 1, wherein the thermal management system further comprises a recuperator heat exchanger, a thermal management expansion device, and a thermal management compressor, wherein the recuperator heat exchanger is in thermal communication with the supercritical carbon dioxide line at a first location downstream of the thermal management expansion device and upstream of the thermal management compressor, and at a second location downstream of thermal management compressor.

8. The gas turbine engine of claim 1, wherein the supercritical carbon dioxide line is configured as a heat sink heat exchanger for removing heat from an airflow through the core air flowpath at the compressor section.

9. The gas turbine engine of claim 8, wherein the supercritical carbon dioxide line comprises a supercritical carbon dioxide loop that removes the heat from the airflow and rejects the heat to an engine component located along the supercritical carbon dioxide loop at a location downstream of the compressor section.

10. The gas turbine engine of claim 9, wherein the engine component comprises a fuel delivery system.

11. The gas turbine engine of claim 9, wherein the thermal management system is a closed thermal system and further comprises a thermal management compressor.

12. The gas turbine engine of claim 9, wherein the thermal management system is a closed power cycle and further comprises a thermal management expansion device and a thermal management compressor downstream of the thermal management expansion device.

13. The gas turbine engine of claim 9, wherein the thermal management system is a closed power cycle and further comprises a thermal management expansion device, a first thermal management compressor downstream of the thermal management expansion device, a second thermal management compressor downstream of the thermal management expansion device, and a splitter portion that splits a flow of supercritical carbon dioxide from the thermal management expansion device to the first thermal management compressor and the second thermal management compressor.

14. A thermal management system for a gas turbine engine, the gas turbine engine comprising a turbomachine having a compressor section, a combustion section, a turbine section, and an exhaust section arranged in serial flow order and together defining at least in part a core air flowpath, the thermal management system comprising:
  a supercritical carbon dioxide line configured to be integrated into a portion of the compressor section.

15. The thermal management system of claim 14, wherein the supercritical carbon dioxide line is positioned in the compressor section such that the supercritical carbon dioxide line is directly thermally coupled to an airflow through the core air flowpath at the compressor section.

16. The thermal management system of claim 14, wherein the compressor section includes a high pressure compressor casing, and wherein the supercritical carbon dioxide line is integrated into a portion of the high pressure compressor casing.

17. The thermal management system of claim 14, wherein the compressor section includes a plurality of stator vanes, and wherein the supercritical carbon dioxide line is integrated into a portion of the plurality of stator vanes.

18. The thermal management system of claim 14, wherein the thermal management system further comprises a recuperator heat exchanger, a thermal management expansion device, and a thermal management compressor, wherein the recuperator heat exchanger is in thermal communication with the supercritical carbon dioxide line at a first location downstream of the thermal management expansion device and upstream of the thermal management compressor, and at a second location downstream of thermal management compressor.

19. A method for actively cooling a gas turbine engine, the gas turbine engine comprising a turbomachine having a compressor section, a combustion section, a turbine section, and an exhaust section arranged in serial flow order and together defining at least in part a core air flowpath, the method comprising:
  using a supercritical carbon dioxide line integrated into a portion of the compressor section such that the supercritical carbon dioxide line is thermally coupled to an airflow through the core air flowpath at the compressor section;
  channeling a flow of supercritical carbon dioxide through the supercritical carbon dioxide line; and
  removing heat from the airflow via the supercritical carbon dioxide line.

20. The method of claim 19, further comprising rejecting the heat to an engine component downstream of the compressor section via the supercritical carbon dioxide line.

* * * * *